United States Patent
Patel et al.

(10) Patent No.: US 10,506,038 B1
(45) Date of Patent: Dec. 10, 2019

(54) METHOD AND SYSTEM FOR IMPLEMENTING A GLOBAL NODE ARCHITECTURE

(71) Applicant: JPMorgan Chase Bank, N.A., New York, NY (US)

(72) Inventors: Hirenkumar Patel, Sugar Land, TX (US); David Woodstrom, Katy, TX (US); Bret Goldsmith, Sugar Land, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 383 days.

(21) Appl. No.: 14/757,565

(22) Filed: Dec. 24, 2015

(51) Int. Cl.
*H04L 29/08* (2006.01)
*H04L 12/26* (2006.01)
*H04L 12/24* (2006.01)

(52) U.S. Cl.
CPC ........ *H04L 67/1095* (2013.01); *H04L 41/042* (2013.01); *H04L 43/10* (2013.01)

(58) Field of Classification Search
CPC .... H04L 67/1095; H04L 41/042; H04L 43/10
See application file for complete search history.

(56) References Cited

U.S. PATENT DOCUMENTS

| | | | | |
|---|---|---|---|---|
| 6,959,342 | B1 * | 10/2005 | Gipp | G06F 13/1657 710/1 |
| 2001/0042073 | A1 * | 11/2001 | Saether | G06F 17/30194 |
| 2002/0131423 | A1 * | 9/2002 | Chan | H04L 67/101 370/400 |
| 2002/0143798 | A1 * | 10/2002 | Lisiecki | H04L 67/1095 |
| 2002/0194324 | A1 * | 12/2002 | Guha | H04L 29/06 709/223 |
| 2006/0088039 | A1 * | 4/2006 | Kakivaya | H04L 12/42 370/400 |
| 2006/0203718 | A1 * | 9/2006 | Benhase | G06F 11/2058 370/220 |
| 2007/0226269 | A1 * | 9/2007 | Anna | G06F 16/182 |
| 2009/0177710 | A1 * | 7/2009 | Holenstein | G06F 17/30578 |

OTHER PUBLICATIONS

Article Name: International mirroring service established for companies with off-shore Internet traffic. Publisher: Business Wire Publication date: Mar. 11, 1997 (Year: 1997).*

* cited by examiner

*Primary Examiner* — Nicholas R Taylor
*Assistant Examiner* — Tania M Pena-Santana
(74) *Attorney, Agent, or Firm* — Hunton Andrews Kurth LLP

(57) ABSTRACT

According to an embodiment of the present invention, a global node system architecture that is specific to a read many and write infrequently application comprising: a plurality of global nodes distributed throughout a global region, each global node comprises: a memory that stores a set of data that is replicated at each node of the plurality of global nodes where each node is a self-contained node so that each node of the plurality of global nodes comprises an exact replica of data; and a processor coupled to the memory and programmed to: synchronize data updates at each of the plurality of global nodes; automatically detect a nearest global node with respect to each of the plurality of global nodes; and initiating a communication with the nearest global node.

14 Claims, 4 Drawing Sheets

METHOD AND SYSTEM FOR IMPLEMENTING A GLOBAL NODE ARCHITECTURE

FIELD OF THE INVENTION

The present invention generally relates to a global node architecture and more specifically to a system for and method of implementing a global node architecture that is specifically configured to support read many and write infrequently applications.

BACKGROUND OF THE INVENTION

Global application performance deteriorates as distance from a primary service increases. Typical patterns involve server deployments in the United States, often resulting in Asia Pacific (APAC) and Europe, Middle East and Africa (EMEA) countries experiencing slower performance than the United States; and extremely slow performance for users in distant locations, e.g., Sydney, South Africa, etc. Existing mitigating solutions are not sufficiently effective, e.g., WAN accelerators are generally network-after-thoughts. And, improvements are not significant enough especially for non-repeat patterns. Independent regional instances have a tendency for divergent functionality and different data drives divergence. Accordingly, true database replication products provide global reach but result in high ongoing costs, both operational and developmental. Current architectures result in severe latency and quality issues.

Other drawbacks may also be present.

SUMMARY OF THE INVENTION

Accordingly, one aspect of the invention is to address one or more of the drawbacks set forth above. According to an embodiment of the present invention, a method and system for implementing a global node system architecture that is specific to a read many and write infrequently application, the global node system architecture comprising: a plurality of global nodes distributed throughout a global region, each global node comprises: a memory that stores a set of data that is replicated at each node of the plurality of global nodes where each node is a self-contained node so that each node of the plurality of global nodes comprises an exact replica of data; and a processor coupled to the memory and programmed to: synchronize data updates at each of the plurality of global nodes; automatically detect a nearest global node with respect to each of the plurality of global nodes; and initiating a read operation with the nearest global node.

In other exemplary embodiments, the preceding method may be performed using a system with a processor and a memory comprising computer-readable instructions which when executed by the processor cause the processor to perform the method steps.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF PREFERRED EMBODIMENTS

Figure 1:
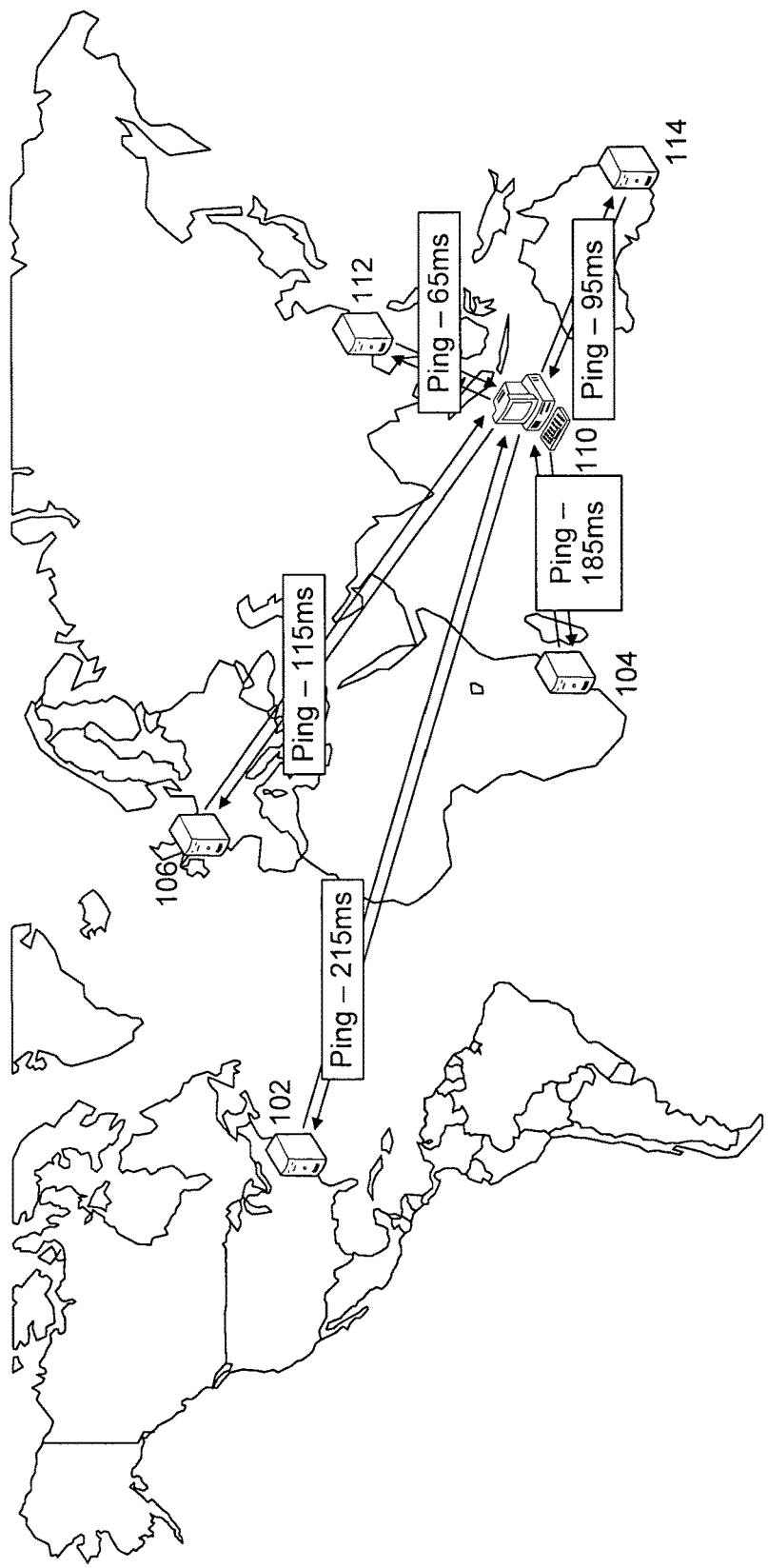
FIG. 1 is an exemplary diagram of a global server node architecture, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to global replication and resilient persistence using an innovative node architecture. More specifically, an embodiment of the present invention is directed to a global node architecture that supports a read many and write infrequently application. According to an embodiment of the present invention, each node is independent and implements smart proximity discovery where the closest node is always chosen. The system of an embodiment of the present invention is directed to optimizing the last-mile performance by ensuring that the nearest dataset is accessed by a global node.

An embodiment of the present invention is particularly suited for global applications that do not require a large amount of data to be replicated at each node (e.g., an exemplary application may include replicating a set of templates, etc.). The node architecture of an embodiment of the present invention effectively automates disaster recovery by re-routing requests to a next fastest instance.

An embodiment of the present invention is directed to an innovative node architecture where each node has distributed components. The components support simplified configurations and lower on-going costs. According to an embodiment of the present invention, a database layer may handle the replication that synchronizes the global nodes. The database layer may provide replication functionality across all global nodes in the architecture of an embodiment of the present invention.

According to an embodiment of the present invention, each node is independent where requests to a node typically do not need to go beyond the node. Moreover, active/active nodes mean that no single point of failure exists.

According to an embodiment of the present invention, smart proximity discovery means that the closest node is chosen. For example, the closest node may be chosen by distance or perceived distance. In this example, an embodiment of the present invention may make multiple simple service calls and determine an average time to finish the call. The node with a shortest average time may be selected. Other methodologies for selecting a closest and/or fastest node may be implemented.

According to an embodiment of the present invention, IT Network services such as hardware load balancing, WAN acceleration, geo-location, remote proximity caching are not needed.

An embodiment of the present invention is directed to read many and write infrequently applications with low urgency of central updates. For example, such an application may include a read only dashboard application that tracks user views and metrics. Another application may include read many and writes unlikely to conflict with low urgency of central updates. Such an application may include form submission applications where ability to edit a form is limited to only a submitter, for example. In this example, the submitter provides the information and then submits but the drop downs and selections are data heavy.

Another exemplary application may involve an add-in application for an existing document management program. In this example, the add-in application provides consistency to presentations and provides a series of templates to provide uniform documents with similar themes, colors and fonts. The add-in application may be updated on a dynamic manner. Using a global node architecture of an embodiment of the present invention enables the dynamic updates to the add-in application to be provided with minimal or no network delays and improved latency. Accordingly, an embodiment of the present invention is directed to improving efficiencies with the global footprint last mile.

Another exemplary application may involve a simple application with business logic and a set of rules that has a global user base. An embodiment of the present invention provides a global node architecture that deploys business logic with the set of rules. An embodiment of the present invention provides a data persistence layer and a reliable global infrastructure with improved last mile performance.

An embodiment of the present invention is directed to a distributed global node architecture that seeks to replicate functions and capabilities for a set of customers of a larger enterprise application at a local site. Other functions and capabilities for other sets of customers may be replicated at other local sites. This architecture reduces the company's footprint to a manageable size and focuses on addressing a particular customer base. According to an exemplary application, data at each global node may be replicated from an enterprise or other central location, and made available to a specific node that is geographically relevant to those users for performance and resiliency.

An embodiment of the present invention may determine what data is to be replicated at each global node. For example, data that does not change frequently or is not subject to change may be replicated and stored at each global node. Such information may include information about a customer, transaction history, enrolled services, reports, current accounts, etc. In general, data stored in each global node may include data that is accessed often and is important to a user. By having such data stored locally at a geographically relevant global node, the user may experience improved performance, personalized service and richer data presentation. To improve performance and resiliency of the digital platform, a subset of enterprise data may be replicated to each global node. The enterprise data may include data that is read often but changes relatively infrequently.

An embodiment of the present invention is directed to replicating a dataset across each global node in a global node architecture. According to another embodiment of the present invention, the datasets may share common data with a customized dataset based on the location of each global node. This exemplary embodiment may be implemented to support foreign compliance issues where each country has some different requirement about what is sensitive and where such data can be stored.

FIG. 1 is an exemplary diagram of a global server node architecture, according to an embodiment of the present invention. An exemplary application supports a read many and write infrequently scenario. As shown in FIG. 1, there are multiple nodes positioned globally. Each node is self-contained during normal operations. A master server may serve as a default server where the other nodes receive updates from the master. In this example, node 102 may represent a master server, where other nodes, such as node 104, node 106 may receive updates from node 102. Data stored globally at each node may be replicated and synchronized. According to an exemplary application, the data at each global node may be an exact replica.

An embodiment of the present invention is directed to automated detection of fastest instance and is further updated regularly. An exemplary node, node 110, may ping the other global nodes regularly. This may occur periodically, at predetermined time intervals, responsive to a request, action or event, etc. In this example, a ping response may indicate how fast a particular node is in relation to a requesting node. Here, the nodes are deemed fastest to slowest as shown by the ping response interval, namely 65 ms, 95 ms, 115 ms, 185 ms and 215 ms. Here, node 110 may identify a fastest node and then use an appropriate node for reading operations. For example, node 110 may identify which node is the fastest from its current location and then use a corresponding set of servers for reading. In this example, a Hong Kong node 112 is the fastest node.

A disaster recovery may be effectively automated with no or little additional infrastructure. Auto-detection may simply re-route requests to a next fastest instance. For example, node 112 may become impaired or otherwise unavailable. Because node 110 does not receive a response from node 112, the current node 110 may then switch to a next global node, which in this example is node 114.

An embodiment of the present invention is directed to ensuring that the relevant dataset is close to the end user so that when the data is transferring to a user's workstation, the request does not have to spend additional network time thereby reducing latency and network resources.

Figure 2:
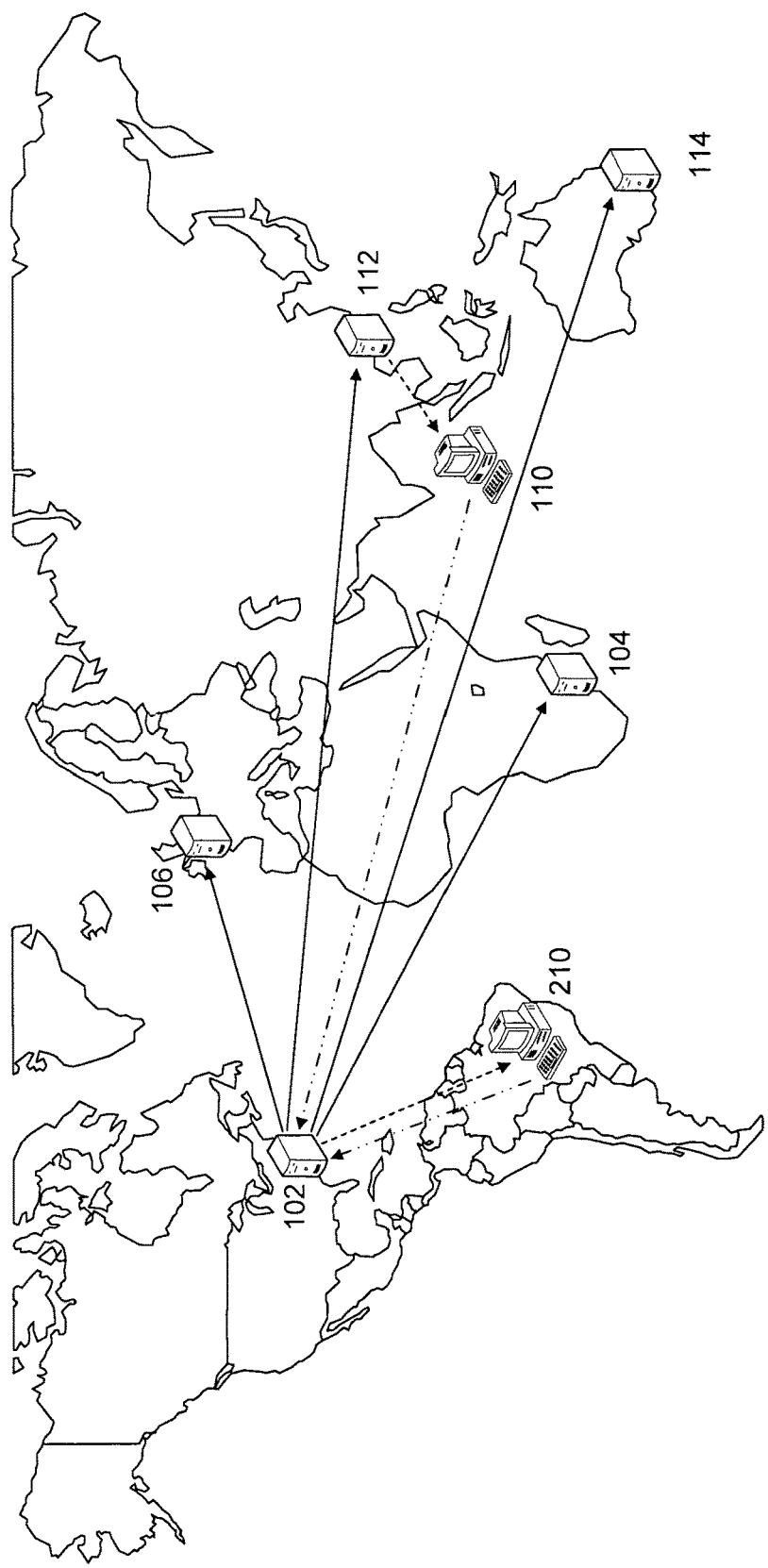
FIG. 2 is an exemplary diagram of a global server node architecture, according to an embodiment of the present invention.

FIG. 2 is an exemplary diagram of a global server node architecture, according to an embodiment of the present invention. According to an embodiment of the present invention, components have simplified configurations compared with other global solutions. For example, a node may read from a closest node and write to a primary server. The global nodes may be replicated and synchronized. For example, node 210 reads from a closest node and then writes to the master database 102. Node 110 also reads from a closest node and writes to the master database 102. An embodiment of the present invention provides a single master to avoid or minimize collisions.

Figure 3:
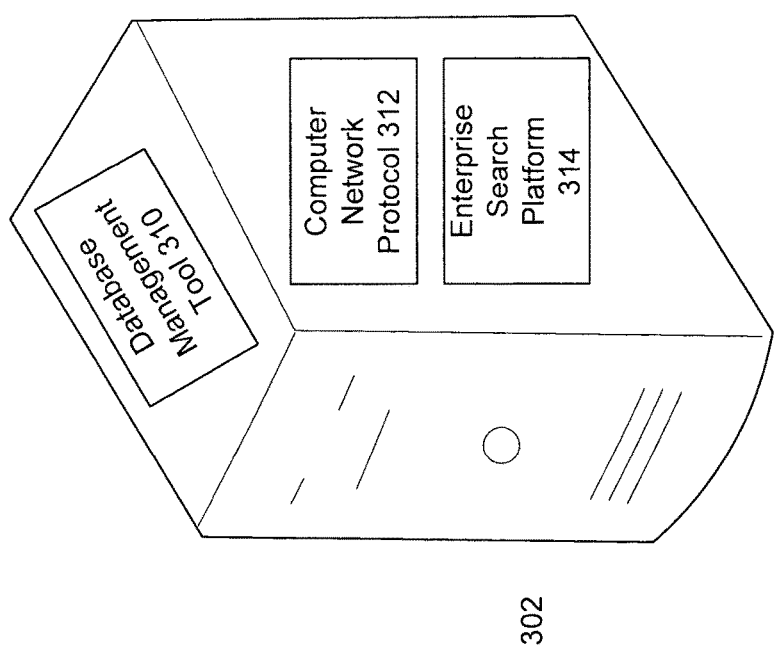
FIG. 3 is an exemplary illustration of node in a global server node architecture, according to an embodiment of the present invention.

FIG. 3 is an exemplary illustration of node in a global server node architecture, according to an embodiment of the present invention. According to an embodiment of the present invention, each self-contained node may host key components. A representative node 302 may include various components including a Database Management Tool 310, a Computer Network Protocol 312 and an Enterprise Search Platform 314. For example, a Database Management Tool 312 may provide synchronization of replication across the architecture. The replicated datasets may be linked together where each global node communicates with another global node within the architecture of an embodiment of the present invention. According to an exemplary embodiment of the present invention, a database management tool, such as Mongo DB, may provide the replication functionality. Other components as well as other cross-platform document-oriented databases may provide the replication and synchronization functionality.

Computer Network Protocol 312 may represent a computer network authentication protocol that allows nodes communicating over a non-secure network to prove their identity to one another in a secure manner. The Computer Network Protocol 312 may build on symmetric key cryptography and a trusted third party, and optionally may use public-key cryptography during certain phases of authentication.

Enterprise Search Platform 314 may provide full-text search, hit highlighting, faceted search, real-time indexing, dynamic clustering, database integration, and rich document handling. The Enterprise Search Platform may also provide distributed search and index replication for scalability and fault tolerance.

In addition, each representative node may also host an enterprise entitlement service. Other programs and/or services may also be hosted on a node.

An exemplary database management component may integrate data in certain types of applications. The database management component may provide high availability with replica sets. A replica set consists of two or more copies of the data. Each replica set member may act in the role of primary or secondary replica at any time. The primary replica may performs writes and reads by default. Secondary replicas maintain a copy of the data of the primary using built-in replication. When a primary replica fails, the replica set automatically conducts an election process to determine which secondary should become the primary. Secondaries may also perform read operations, where the data is eventually consistent by default.

Figure 4:
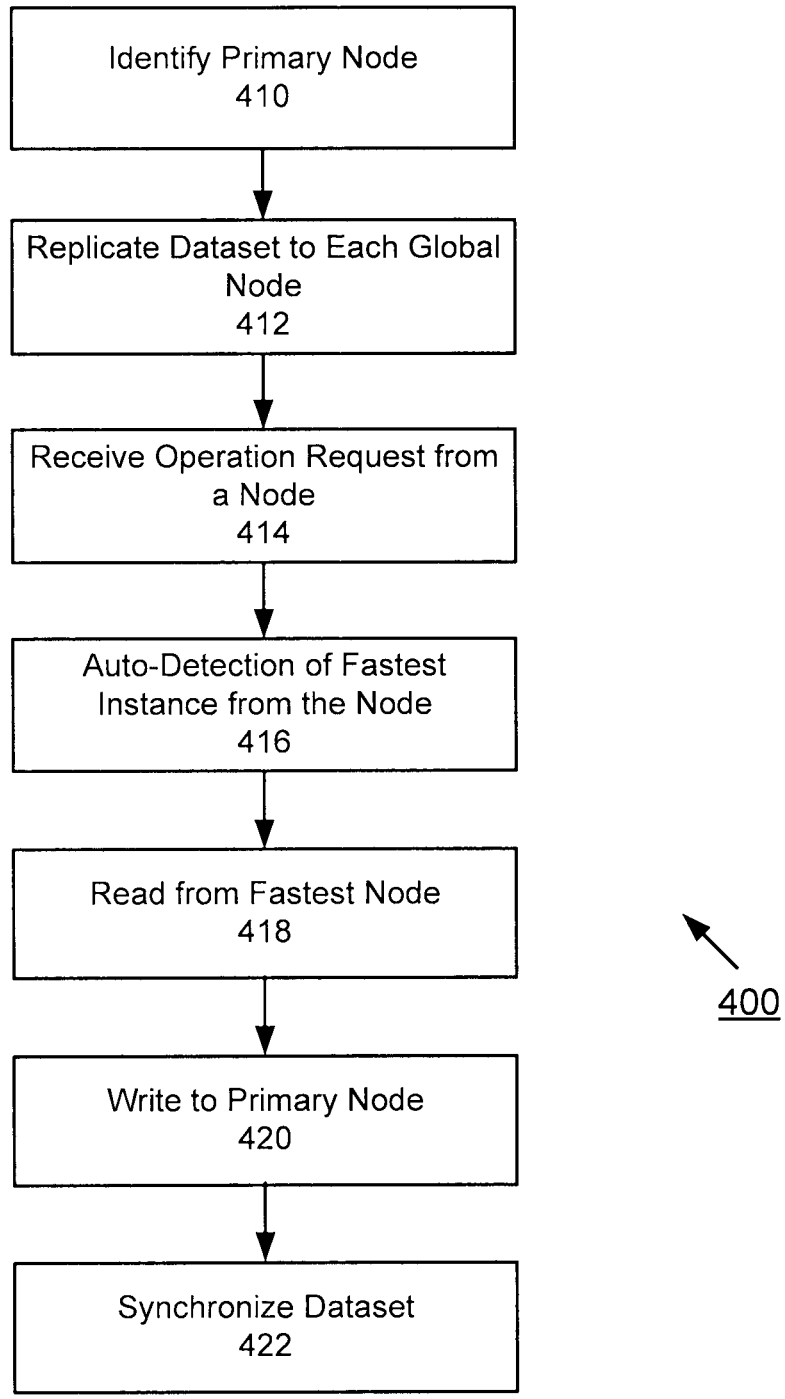
FIG. 4 is an exemplary flowchart implementing a global server node architecture, according to an embodiment of the present invention.

FIG. 4 is an exemplary flowchart implementing a global server node architecture, according to an embodiment of the present invention. At step 410, a primary node within a global node architecture may be identified. The primary node may provide updates to the global nodes. At step 412, data may be replicated to each global node of a node architecture. At step 414, an operation request may be initiated by a node. At step 416, an auto-detection may be performed to identify a fastest instance from the requesting global node. For example, the requesting node may identify a closest available node using pings or other mechanism. At step 418, the requesting node may read from the nearest global node. At step 420, the requesting node may then write to the primary node. At step 422, synchronization may be performed across all nodes of the node architecture. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

An embodiment of the present invention is directed to a global node architecture to provide diversification of data center locations for enhanced performance and availability. An embodiment of the present invention is directed to building redundancy into each global node.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Databases (which may include datacenters and other storage devices) may comprise or interface with a searchable database. Databases may comprise, include or interface to a relational database. Other databases, such as a query format database, a Standard Query Language (SQL) format database, a storage area network (SAN), or another similar data storage device, query format, platform or resource may be used. Databases may comprise a single database or a collection of databases, dedicated or otherwise. In one embodiment, Databases may store or cooperate with other databases to store the various data and information described herein. In some embodiments, Databases may comprise a file management system, program or application for storing and maintaining data and information used or generated by the various features and functions of the systems and methods described herein. In some embodiments, Databases may store, maintain and permit access to customer information, transaction information, account information, and general information used to process transactions as described herein. In some embodiments, Databases is connected directly to a processor, which, in some embodiments, it is accessible through a network, such as communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 210 and 212 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, processor(s) may include any terminal (e.g., a typical home or personal computer system, telephone, personal digital assistant (PDA) or other like device) whereby a user may interact with a network, such as communications network, for example, that is responsible for transmitting and delivering data and information used by the various systems and methods described herein. Processor(s) may include, for instance, a personal or laptop computer, a telephone, or PDA. Processor(s) may include a microprocessor, a microcontroller or other general or special purpose device operating under programmed control. Processor(s) may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Processor(s) may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Processor(s) may also include a network-enabled appliance, a browser-equipped or other network-enabled cellular telephone, or another TCP/IP client or other device.

As described above, the system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

What is claimed is:

1. A global node system architecture that is specific to a read many and write infrequently application, the global node system architecture comprising:
   a primary node; and
   a plurality of self-contained global nodes distributed throughout a global region, wherein each global node is connected to the primary node through a network, and wherein the primary node periodically replicates data updates to each of the plurality of global nodes, the periodic data updates comprising a data set;
   each global node comprises:
      a memory that stores the data set from the primary node so that each node of the plurality of global nodes comprises the same data set comprising an exact replica of data, and wherein the replicated set of data represents data with low urgency of central updates; and
      a processor coupled to the memory and programmed to:
      synchronize the data updates from the primary node at each of the plurality of global nodes;
      automatically detect a nearest global node with respect to each of the plurality of global nodes, wherein the nearest global node is detected based on a shortest ping;
      receive, at the nearest global node, a user request that requires a read operation;
      perform the read operation from the nearest global node;
      perform write operations to the primary node to minimize collisions; and
      automatically re-route to a next nearest global node if a closest global node becomes unresponsive.

2. The system of claim 1, wherein each global node comprises: a computer network protocol.

3. The system of claim 1, wherein each global node comprises: an enterprise search platform.

4. The system of claim 1, wherein each global node comprises: entitlements data.

5. The system of claim 1, wherein the plurality of global nodes are located across multiple countries.

6. The system of claim 1, wherein the plurality of global nodes are located across multiple continents.

7. The system of claim 1, wherein the replicated set of data comprise document templates.

8. A method for implementing global node system architecture that is specific to a read many and write infrequently application, at each self-contained global node within a plurality of global nodes distributed throughout a global region comprising the steps of:
   storing, via a memory, a set of data that is replicated from a primary node to each node of the plurality of global nodes so that each node of the plurality of global nodes comprises the same data set comprising an exact replica of data, and wherein the replicated set of data represents data with low urgency of central updates; and
   synchronizing, from the primary node via a node processor, data updates at each of the plurality of global nodes;
   automatically detecting, via the node processor, a nearest global node with respect to each of the plurality of global nodes;
   receiving, at the nearest global node, a user request that requires one or more read operations;
   performing, via the node processor, the read operations from the nearest global node, wherein the nearest global node is detected based on a shortest ping;
   performing write operations to a primary node, wherein the primary node provides data updates to each of the plurality of global nodes; and
   automatically re-routing to a next nearest global node if a closest global node becomes unresponsive.

9. The method of claim 8, wherein each global node comprises: a computer network protocol.

10. The method of claim 8, wherein each global node comprises: an enterprise search platform.

11. The method of claim 8, wherein each global node comprises: entitlements data.

12. The method of claim 8, wherein the plurality of global nodes are located across multiple countries.

13. The method of claim 8, wherein the plurality of global nodes are located across multiple continents.

14. The method of claim 8, wherein the replicated set of data comprise document templates.

* * * * *